United States Patent
Qiu et al.

(10) Patent No.: US 9,524,051 B2
(45) Date of Patent: Dec. 20, 2016

(54) METHOD AND TERMINAL FOR INPUTTING MULTIPLE EVENTS

(71) Applicant: Shenzhen China Star Optoelectronics Technology Co., Ltd., Shenzhen, Guangdong (CN)

(72) Inventors: Jie Qiu, Guangdong (CN); Yung-Iun Lin, Guangdong (CN); Ruhai Fu, Guangdong (CN); Chengliang Ye, Guangdong (CN); Chun-kai Chang, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 179 days.

(21) Appl. No.: 14/407,447

(22) PCT Filed: Nov. 20, 2014

(86) PCT No.: PCT/CN2014/091772
§ 371 (c)(1),
(2) Date: Dec. 11, 2014

(87) PCT Pub. No.: WO2016/070465
PCT Pub. Date: May 12, 2016

(65) Prior Publication Data
US 2016/0274711 A1      Sep. 22, 2016

(30) Foreign Application Priority Data
Nov. 6, 2014  (CN) .......................... 2014 1 0621153

(51) Int. Cl.
*G06F 3/041*  (2006.01)
*G06F 3/0482*  (2013.01)
*G06F 3/0484*  (2013.01)
*G06F 3/0481*  (2013.01)
*G06F 3/0488*  (2013.01)

(52) U.S. Cl.
CPC ........... *G06F 3/0416* (2013.01); *G06F 3/0414* (2013.01); *G06F 3/0482* (2013.01); *G06F 3/04817* (2013.01); *G06F 3/04842* (2013.01); *G06F 3/04883* (2013.01); *G06F 2203/04104* (2013.01)

(58) Field of Classification Search
CPC .... G06F 3/044; G06F 3/04847; G06F 3/0488; G06F 3/04883; G06F 3/041; G06F 3/04845; G06F 3/0414
See application file for complete search history.

(56) References Cited

U.S. PATENT DOCUMENTS

| | | | | |
|---|---|---|---|---|
| 2010/0298034 | A1* | 11/2010 | Shin ..................... | G06F 3/04883 455/566 |
| 2013/0002432 | A1* | 1/2013 | Sprague ................... | A61B 5/16 340/573.1 |
| 2014/0340327 | A1* | 11/2014 | Herz ....................... | G06F 3/044 345/173 |

* cited by examiner

*Primary Examiner* — Abbas Abdulselam
(74) *Attorney, Agent, or Firm* — Andrew C. Cheng

(57) ABSTRACT

The present invention discloses a method and a terminal for inputting multiple events. The methods includes: receiving touch signals produced by a touch screen corresponding to a touch action of a user's finger; ascertaining a touch direction of the user's finger to the touch screen according to the touch signals; and triggering different events corresponding to different touch directions of the user's finger. Using the above method, different events will be triggered when the touch direction of the user's fingers is different and thus the problem of one touch action of the user's finger can only trigger one event is solved.

12 Claims, 3 Drawing Sheets

Touch in the first direciton

Touch in the second direction

METHOD AND TERMINAL FOR INPUTTING MULTIPLE EVENTS

TECHNICAL FIELD

The present invention relates to inputting methods and terminals, and more particularly to a method and a terminal for inputting multiple events.

BACKGROUND

As an auxiliary inputting means, touch screens and widely used in various computers, mobile terminals and other equipment. Using the touch screens, the user only need to touch the touch screen with their finger to achieve operation to icons or texts, thus making the human-machine interaction more straightforward.

However, the current touch screens still have imperfections, such as when the user's finger on the touch screen, every touch action only triggers an event input. Therefore, in order to achieve the selection of an icon or launching an application, it is required to perform touch actions different times. For example, a single-touch action is set to trigger an event for selecting an icon, and two or more touch actions within a predetermined time is set to trigger an event for launching an application corresponding to the icon.

SUMMARY

A primary problem solved by embodiments of the present invention is to provide a method and a terminal for inputting multiple events. The method can trigger different events when the finger touches the touch screen at different touch directions, and thus solving the problem of one touch action can only trigger one event.

To solve the above problem, the embodiments of the present invention provide a method for inputting multiple events. The method includes the following steps: receiving touch signals produced by a touch screen corresponding to a touch action of a user's finger; ascertaining a touch direction of the user's finger to the touch screen according to the touch signals; and triggering different events corresponding to different touch directions of the user's finger. The step of ascertaining a touch direction of the user's finger to the touch screen according to the touch signals includes the following steps: determining whether a muscle portion and a non-muscle portion of the finger both touch the touch screen or only the muscle portion of the finger touches the touch screen according to the touch signals; if the muscle portion and the non-muscle portion of the finger both touch the touch screen then a touch direction of the user's finger is a first direction; if only the muscle portion of the finger touches the touch screen then the touch direction of the user's finger is a second direction. The step of triggering different events corresponding to different touch directions of the user's finger includes: if the touch direction is the first direction then triggering a first event; and if the touch direction is the second direction then triggering a second event different with the first event. The first event is configured for launching an icon at a touch point corresponding to the first event; and the second event is configured for selecting an icon at a touch point corresponding to the second event.

In one embodiment, the non-muscle portion, for example, is fingernail of the user's finger.

In one embodiment, the step of determining whether a muscle portion and a non-muscle portion of the finger both touch the touch screen or only the muscle portion of the finger touches the touch screen according to the touch signals includes: determining whether a muscle portion and a non-muscle portion of the finger both touch the touch screen or only the muscle portion of the finger touches the touch screen according to intensity variation of the touch signals.

In one embodiment, the step of determining whether a muscle portion and a non-muscle portion of the finger both touch the touch screen or only the muscle portion of the finger touches the touch screen according to the touch signals includes: determining whether a muscle portion and a non-muscle portion of the finger both touch the touch screen or only the muscle portion of the finger touches the touch screen according to the shape or size of a touching area of the touch screen.

To solve the above problem, embodiments of the present invention provide a method for inputting multiple events. The method includes steps of: receiving touch signals produced by a touch screen corresponding to a touch action of a user's finger; ascertaining a touch direction of the user's finger to the touch screen according to the touch signals; and triggering different events corresponding to different touch directions of the user's finger.

In one embodiment, the step of ascertaining a touch direction of the user's finger to the touch screen according to the touch signals includes: ascertaining the touch direction of the user's finger to the touch screen is a first direction or a second direction of the touch screen according to the touch signals. The step of triggering different events corresponding to different touch directions of the user's finger includes: if the touch direction is the first touch direction then triggering a first event; and if the touch direction is the second touch direction then triggering a second event.

In one embodiment, the step of ascertaining the touch direction of the user's finger to the touch screen is a first direction or a second direction of the touch screen according to the touch signals includes: determining whether a muscle portion and a non-muscle portion of the finger both touch the touch screen or only the muscle portion of the finger touches the touch screen. If the muscle portion and the non-muscle portion of the finger both touch the touch screen then the touch direction of the user's finger is the first direction; if only the muscle portion of the finger touches the touch screen then the touch direction of the user's finger is the second direction.

In one embodiment, the non-muscle portion, for example, is fingernail of the user's finger.

In one embodiment, the step of determining whether a muscle portion and a non-muscle portion of the finger both touch the touch screen or only the muscle portion of the finger touches the touch screen according to the touch signals includes: determining whether a muscle portion and a non-muscle portion of the finger both touch the touch screen or only the muscle portion of the finger touches the touch screen according to intensity variation of the touch signals.

In one embodiment, the step of determining whether a muscle portion and a non-muscle portion of the finger both touch the touch screen or only the muscle portion of the finger touches the touch screen according to the touch signals includes: determining whether a muscle portion and a non-muscle portion of the finger both touch the touch screen or only the muscle portion of the finger touches the touch screen according to the shape or size of a touching area of the touch screen.

In one embodiment, the first event is configured for launching an icon at a touch point corresponding to the first event; and the second event is configured for selecting an icon at a touch point corresponding to the second event.

To solve the above embodiment, the embodiments of the present invention provide a terminal for inputting multiple events, which includes a touch screen and a processor.

The touch screen is configured for producing touch signal corresponding to touch actions of the user's finger. The processor is configured for ascertaining a touch direction of the user's finger to the touch screen according to the touch signals; and triggering different events corresponding to different touch directions of the user's finger.

In one embodiment, the different touch directions of the user's finger includes a first direction that the muscle portion and non-muscle portion of the user's finger both touch the touch screen, and a second direction that only the muscle portion of the user's finger touches the touch screen. When the touch direction is the first direction, the processor triggers a first event; and when the touch direction is the second direction, the processor triggers a second event.

In one embodiment, the first event is configured for launching an icon at a touch point corresponding to the first event; and the second event is configured for selecting an icon at a touch point corresponding to the second event.

The advantages of embodiments of the present invention are described as follows. Differing from the existing art, in the method and terminal for inputting multiple events provided by embodiments of the present invention, the touch screen produces different touch signals when the user's finger touch the touch screen in different manners. Thus, the touch direction of the user's finger on the touch screen can be determined according to the touch signals, and different events can be triggered according to the different touch directions. There are various touch directions of the user's finger, and therefore different touch status can be produced to generate various events.

DETAILED DESCRIPTION OF PREFERRED EMBODIMENTS

Figure 1:
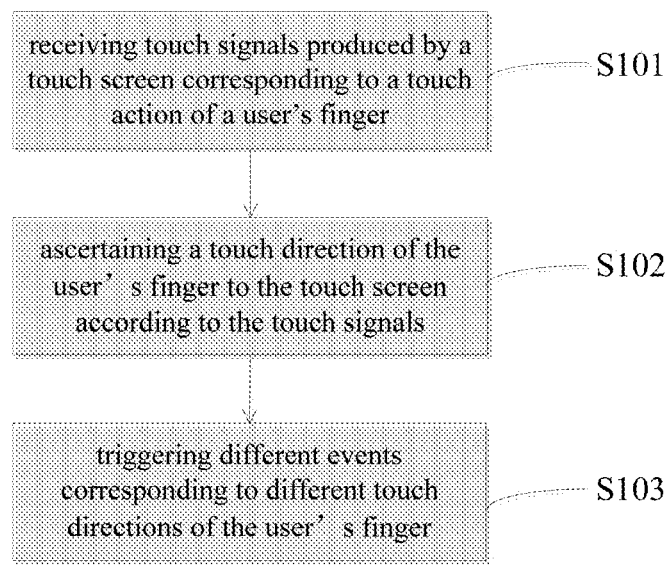
FIG. 1 is a flow chart of a method for inputting multiple events in accordance with a first embodiment of the present invention.

Referring to FIG. 1, FIG. 1 is a flow chart of a method for inputting multiple events in accordance with a first embodiment of the present invention. The present embodiment provides a method for inputting multiple events including the following steps.

Step S101, receiving touch signals produced by a touch screen corresponding to a touch action of a user's finger.

When the user's finger touch the touch screen, the touch screen could sense the users' touch action and produce corresponding touch signals. The touch screen can be a resistance type touch screen, or a capacitive type touch screen. Generally, the touch screen includes a number of pixels arranged in an array and each pixel is a separate detecting unit. Each detecting unit positions the user's touch action by detecting the resistance variation or capacitance variation caused by the touch action of the user's finger. The touch screen may use an absolute positioning method, that is, each pixel has a fixed coordinates (x,y). When the user's finger touches the touch screen, detecting units corresponding to each pixel is scanned to obtain a touch signal set $A[(x_1,y_1), (x_2,y_2), \ldots (x_n,y_n)]$ described by coordinates and detected signal intensity, and then the touch action of the user is determined according to the touch signals.

Step S102, ascertaining a touch direction of the user's finger to the touch screen according to the touch signals.

Currently, the touch action of the user's finger usually includes the following types: single click, multiple clicks, swipe gestures or multi-touch. For the touch actions of single click, multiple clicks, swiping or multi-touch, the touch screen is capable of recognizing the type of touch action according to the intensity distribution, time continuity or space continuity of touch signals. In the present embodiment, a touch direction of the touch action is further determined. The methods for determining the touch direction includes a method described in the following context based on the recognition of the finger's muscle portion and non-muscle portion, and can also include other methods that are capable of achieving recognition of different touch directions.

Step S103, triggering different events corresponding to different touch directions of the user's finger.

In the present embodiment, different touch directions are corresponding to different events. That is, when the user touches the touch screen at different directions, different events are triggered. In the step S102 of the present embodiment, the touch direction of the user's finger to the touch screen is divided into a first direction of a second direction. In the present embodiment, if the touch direction is the first direction, a launching event is triggered, and an application corresponding to an icon is launched. If the touch direction is the second direction, a selecting event is triggered, and an icon corresponding to the touch point is selected. The events triggered in the above description is the default configuration, however the user can also custom the events triggered by the different touch directions according to their own operation habits.

The above description mainly describes the process of triggering single click. Furthermore, the touch directions of multiple clicks, swipe gestures and multi-touch can also be divided to trigger different events.

Differing from the existing art, in the present embodiment, the touch screen produces different touch signals when the user's finger touches the touch screen in different manners. Thus, the touch direction of the user's finger on the touch screen can be determined according to the touch signals, and different events can be triggered according to the different touch directions. In detail, different touch signals are recognized using the pressure signals or touch area signals to determine the touch direction of the user's finger and trigger different events.

Figure 2:
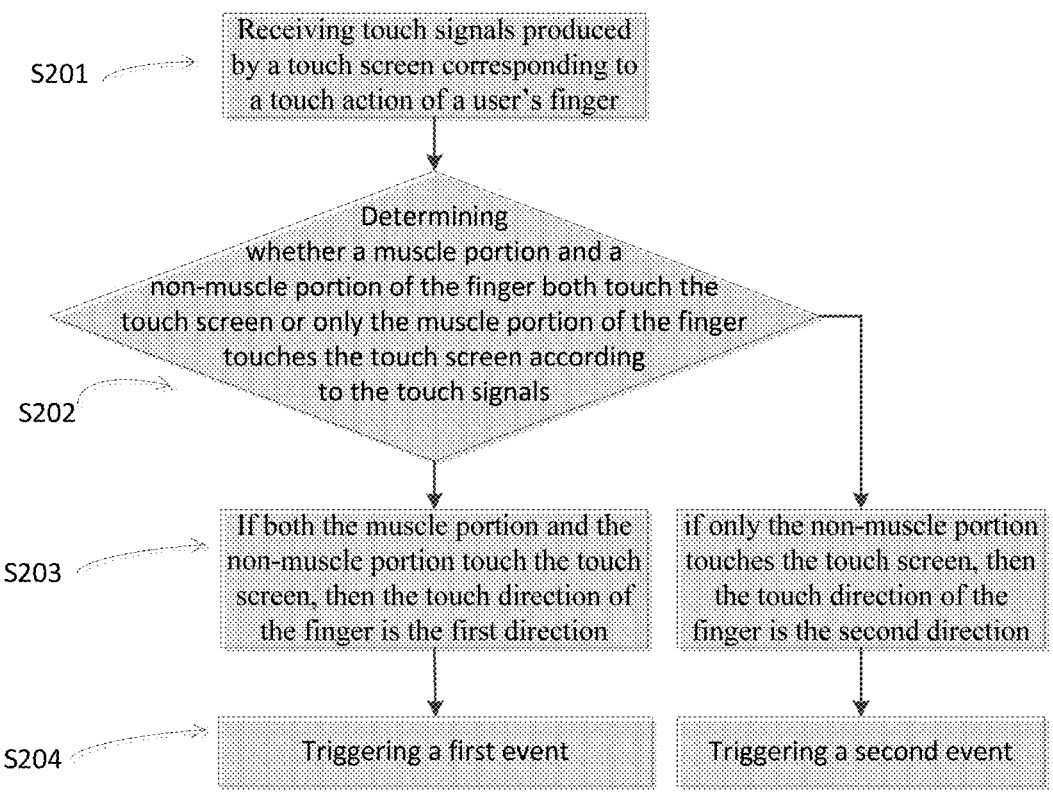
FIG. 2 is a flow chart of a method for inputting multiple events in accordance with a second embodiment of the present invention.

Referring to FIG. 2, FIG. 2 is a flow chart of a method for inputting multiple events in accordance with a second embodiment of the present invention. The present embodiment provides a method for inputting multiple events including the following steps.

Step S201, receiving touch signals produced by a touch screen corresponding to a touch action of a user's finger.

This step is similar to the step S101 described in the first embodiment.

Step S202, determining whether a muscle portion and a non-muscle portion of the finger both touch the touch screen or only the muscle portion of the finger touches the touch screen according to the touch signals.

In the present embodiment, resistance variation or capacitance variation caused by the muscle portion and the non-muscle portion of the finger are different when the finger touches the touch screen. Thus, touch signals produced by the touch screen corresponding to the two portions are also different, and the touch direction can be distinguished by judging is only the muscle portion touches the touch screen, is only the non-muscle portion touches the touch screen, or both the muscle portion and the non-muscle portion touch the touch screen. For example, the muscle portion is the fingernail, and the muscle portion is the finger body. Specifically, if the touch signals show that both the muscle portion and the non-muscle portion of the finger touch the touch screen, then the touch direction is the first direction; and if the touch signals show that only the muscle portion of the finger touches the touch screen, then the touch direction is the second direction. In other embodiments, the touch direction is defined as a third direction if the touch signals show that only the non-muscle portion of the finger touches the touch screen. If touch signals produced by different touch actions can be recognized, then a number of touch directions can be recognized correspondingly.

Figure 3:
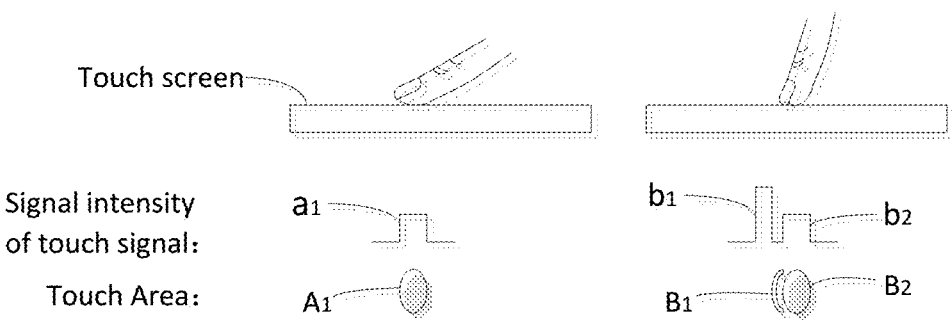
FIG. 3 is a schematic view of different touch directions of the user's finger and a detecting method in accordance with the second embodiment of the present invention.

As shown in FIG. 3, whether a muscle portion and a non-muscle portion of the finger both touch the touch screen or only the muscle portion of the finger touches the touch screen is determined according to intensity variation of the touch signals, or according to the shape or size of a touching area of the touch screen. Specifically, the intensity variation of produced touch signals can be presented by a pattern of single square wave $a_1$ when only the muscle portion of the user's finger touches the touch screen. The intensity variation of produced touch signals can be presented by a pattern including two continuous square waves $b_1$ and $b_2$ when both the muscle portion and the non-muscle portion (fingernail) touch the touch screen. In addition, the touch area is an elliptical area $A_1$ of a predetermined size when only the muscle portion of the user's finger touches the touch screen, and the touch area includes an arc-shaped area $B_1$ and an elliptical area $B_2$ adjacent to the arc-shaped area when both the muscle portion and the non-muscle portion touch the touch screen. Besides, the size ratio of the arc-shaped area and the elliptical area is in a predetermined range.

Step S203, determining the touch direction of the user's finger according to whether a muscle portion and a non-muscle portion of the finger both touch the touch screen or only the muscle portion of the finger touches the touch screen.

If both the muscle portion and the non-muscle portion touch the touch screen, then the touch direction of the finger is the first direction, and if only the non-muscle portion touches the touch screen, then the touch direction of the finger is the second direction.

Step S204, triggering different events according to different touch directions of the user's finger.

Figure 4:
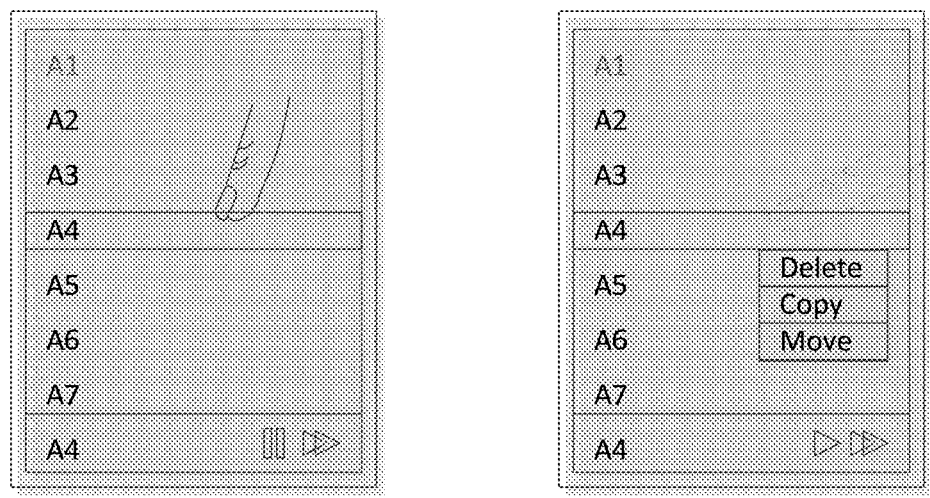
FIG. 4 is a schematic view showing that different events are triggered by different touch directions in accordance with the second embodiment of the present invention.

According to the touch direction, if the touch direction is the first direction, then a first event is triggered; and if the touch direction is the second direction then a second event different with the first event is triggered. The first event, for example, presents to launch something or move something, and the second event present to select or end select. In addition, the actions corresponding to the first event and the second event can be customized. When the user doesn't change the configuration, the first event presents to launch an icon at a touch position corresponding to the first event in the default mode, and the second event presents to select an icon at a touch position corresponding to the second event. In detail, referring to FIG. 4, taking an operation to a music menu as an example, a music corresponding to a menu item is played when the touch direction of the user's finger is the first direction. The menu item is selected when the touch direction of the user's finger is the second direction, and an editing menu of a music corresponding to the menu item is entered.

Differing from the existing art, the present embodiment can determine the touch direction of the user's finger is the first direction or the second direction by determining whether the touch area of the finger is elliptical and arc-shaped, or only elliptical, and thus different events can be triggered.

Figure 5:
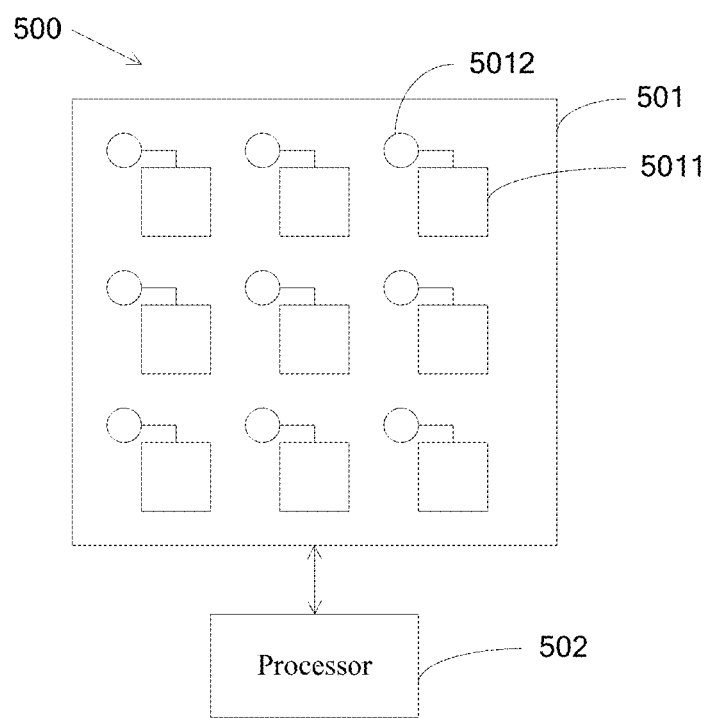
FIG. 5 is schematic view of a terminal for inputting multiple events in accordance with a third embodiment.

Referring to FIG. 5, FIG. 5 is a schematic view of a terminal for inputting multiple events in accordance with a fourth embodiment of the present invention. The present invention provides a terminal 500 including a touch screen 501 and a processor 502.

The touch screen is configured for producing touch signal corresponding to touch actions of the user's finger.

In the present embodiment, the touch screen 501 further includes a number pixels 5011 arranged in a matrix, and each pixel 5011 includes a detecting unit 5012. When the user's finger touches the touch screen 501, the detecting units 5012 in the pixels 5011 within a touch area can detect the touch signals and transmit the touch signals to the processor 502.

The processor 502 is configured for ascertaining a touch direction of the user's finger to the touch screen according to the touch signals; and triggering different events corresponding to different touch directions of the user's finger.

The coordinates of the pixels 5011 in the touch screen are recorded in the processor 502. When the detecting units 5012 transmit the touch signals to the processor 502, the processor 502 records the signal intensity and coordinates of corresponding detecting units. Each touch action has a corresponding touch signal. For multiple clicks, the continuous clicks in a predetermined time period are regarded as multiple clicks, for example, when the time difference between two clicks is within 3 s then the two clicks are regarded as a multi-click, and when the time difference exceeds 3 s then the two clicks are regarded as two separate single clicks. For a multi-click, the touch signals further includes the times of clicks. For a swipe gesture, the touch signals further includes the displacement information.

After receiving the touch signals, the processor 502 recognize the touch signals to determine the touch direction of the user's finger on the touch screen, and then triggers different events according to different touch directions. The touch directions of the user's finger includes two types, the first direction if both the muscle portion and the non-muscle portion of the user's finger touch the touch screen 501, and the second direction if only the muscle portion of the users finger touches the touch screen 501. If the touch direction is the first direction, the processor 502 triggers the first event, and if the touch direction is the second direction, the processor 502 triggers the second event different with the first event.

In the terminal 500, the first event is configured for launching an icon at a touch point corresponding to the first event; and the second event is configured for selecting an icon at a touch point corresponding to the second event, according to default mode. The user can also customize the function corresponding to the different events.

The work process of the terminal 500 includes the following steps. Firstly, the touch screen 501 produces touch signals corresponding to a touch action. Then the processor 502 receives the touch signals produced by the touch screen 501, determines the touch direction, and further triggers different events. This process is similar to the flow described in the method for inputting multiple events of the second embodiment.

Differing from the existing art, the touch screen of the present embodiment can detect the touch action of the user and transmit the touch signals to the processor. The processor processes the touch signals to determine the touch direction, and further triggers different events.

The above description is only embodiment of the present invention, and is not used to limit the scope of the present invention. Any equivalent structure or equivalent flow alternatives made from the specification and figures of the present invention, or direct or indirect application of the present invention into other related fields, should be included in the scope of the present invention.

What is claimed is:

1. A method for inputting multiple events, comprising:
receiving touch signals produced by a touch screen corresponding to a touch action of a user's finger;
ascertaining a touch direction of the user's finger to the touch screen according to the touch signals; and
triggering different events corresponding to different touch directions of the user's finger;
the step of ascertaining a touch direction of the user's finger to the touch screen according to the touch signals comprising:
determining whether a muscle portion and a non-muscle portion of the finger both touch the touch screen or only the muscle portion of the finger touches the touch screen according to the touch signals;
if the muscle portion and the non-muscle portion of the finger both touch the touch screen then a touch direction of the user's finger being a first direction; and
if only the muscle portion of the finger touches the touch screen then the touch direction of the user's finger being a second direction;
the step of triggering different events corresponding to different touch directions of the user's finger comprising:
if the touch direction is the first direction then triggering a first event; and
if the touch direction is the second direction then triggering a second event different with the first event;
the first event being configured for launching an icon at a touch point corresponding to the first event; and the second event being configured for selecting an icon at a touch point corresponding to the second event.

2. The method of claim 1, wherein the non-muscle portion is fingernail of the user's finger.

3. The method of claim 1, wherein the step of determining whether a muscle portion and a non-muscle portion of the finger both touch the touch screen or only the muscle portion of the finger touches the touch screen according to the touch signals comprises:
determining whether a muscle portion and a non-muscle portion of the finger both touch the touch screen or only the muscle portion of the finger touches the touch screen according to intensity variation of the touch signals.

4. The method of claim 1, wherein the step of determining whether a muscle portion and a non-muscle portion of the finger both touch the touch screen or only the muscle portion of the finger touches the touch screen according to the touch signals comprises:
ascertaining the shape or size of a touch area of the touch screen according to the touch signals; and
determining whether a muscle portion and a non-muscle portion of the finger both touch the touch screen or only the muscle portion of the finger touches the touch screen according to the shape or size.

5. A method for inputting multiple events, comprising:
receiving touch signals produced by a touch screen corresponding to a touch action of a user's finger;
ascertaining a touch direction of the user's finger to the touch screen according to the touch signals; and
triggering different events corresponding to different touch directions of the user's finger;
wherein the step of ascertaining a touch direction of the user's finger to the touch screen according to the touch signals comprises:
ascertaining the touch direction of the user's finger to the touch screen is a first direction or a second direction of the touch screen according to the touch signals;
wherein the step of ascertaining the touch direction of the user's finger to the touch screen is a first direction or a second direction of the touch screen according to the touch signals comprises:
determining whether a muscle portion and a non-muscle portion of the finger both touch the touch screen or only the muscle portion of the finger touches the touch screen;
if the muscle portion and the non-muscle portion of the finger both touch the touch screen then the touch direction of the user's finger being the first direction; and
if only the muscle portion of the finger touches the touch screen then the touch direction of the user's finger being the second direction.

6. The method of claim 5, wherein
the step of triggering different events corresponding to different touch directions of the user's finger comprises:
if the touch direction is the first touch direction then triggering a first event; and
if the touch direction is the second touch direction then triggering a second event.

7. The method of claim 6, wherein the first event is configured for launching an icon at a touch point corresponding to the first event; and the second event is configured for selecting an icon at a touch point corresponding to the second event.

8. The method of claim 5, wherein the non-muscle portion, for example, is fingernail of the user's finger.

9. The method of claim 5, wherein the step of determining whether a muscle portion and a non-muscle portion of the finger both touch the touch screen or only the muscle portion of the finger touches the touch screen according to the touch signals comprises:
determining whether a muscle portion and a non-muscle portion of the finger both touch the touch screen or only the muscle portion of the finger touches the touch screen according to intensity variation of the touch signals.

10. The method of claim 5, wherein the step of determining whether a muscle portion and a non-muscle portion of the finger both touch the touch screen or only the muscle portion of the finger touches the touch screen according to the touch signals includes:

ascertaining the shape or size of a touch area of the touch screen according to the touch signals; and determining whether a muscle portion and a non-muscle portion of the finger both touch the touch screen or only the muscle portion of the finger touches the touch screen according to the shape or size.

11. A terminal for inputting multiple events, comprising:

a touch screen, configured for producing touch signals corresponding to touch actions of the user's finger; and a processor, configured for ascertaining a touch direction of the user's finger to the touch screen according to the touch signals and triggering different events corresponding to different touch directions of the user's finger;

wherein the different touch directions of the user's finger comprise a first direction that the muscle portion and non-muscle portion of the user's finger both touch the touch screen, and a second direction that only the muscle portion of the user's finger touches the touch screen; when the touch direction is the first direction, the processor triggering a first event; and when the touch direction is the second direction, the processor triggering a second event.

12. The terminal of claim 11, wherein the first event is configured for launching an icon at a touch point corresponding to the first event; and the second event is configured for selecting an icon at a touch point corresponding to the second event.

* * * * *